Jan. 10, 1933.    G. D. DEWEY    1,893,932
DEVICE FOR ROCKING THE BODIES OF MOTOR VEHICLES
Filed June 23, 1931

Inventor:
George D. Dewey,
by Walter E. Lombard Atty.

Patented Jan. 10, 1933

1,893,932

UNITED STATES PATENT OFFICE

GEORGE DEVER DEWEY, OF EAST MILTON, MASSACHUSETTS

DEVICE FOR ROCKING THE BODIES OF MOTOR VEHICLES

Application filed June 23, 1931. Serial No. 546,366.

This invention relates to mechanism for imparting a slow rocking motion to the bodies of motor vehicles during the lubrication thereof, and has for its object the production of an inexpensive device which may be placed under a running board bracket and then be actuated by electricity to raise and lower the body of the car and cause the grease being inserted around the shackle bolts of the springs to be spread more evenly over the surface of said bolts.

This object is attained by the mechanism illustrated in the accompanying drawing.

For the purpose of illustrating the invention, one preferred form thereof is illustrated in the drawing, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawing.

Similar characters indicate like parts throughout the several figures of the drawing.

Figure 1:
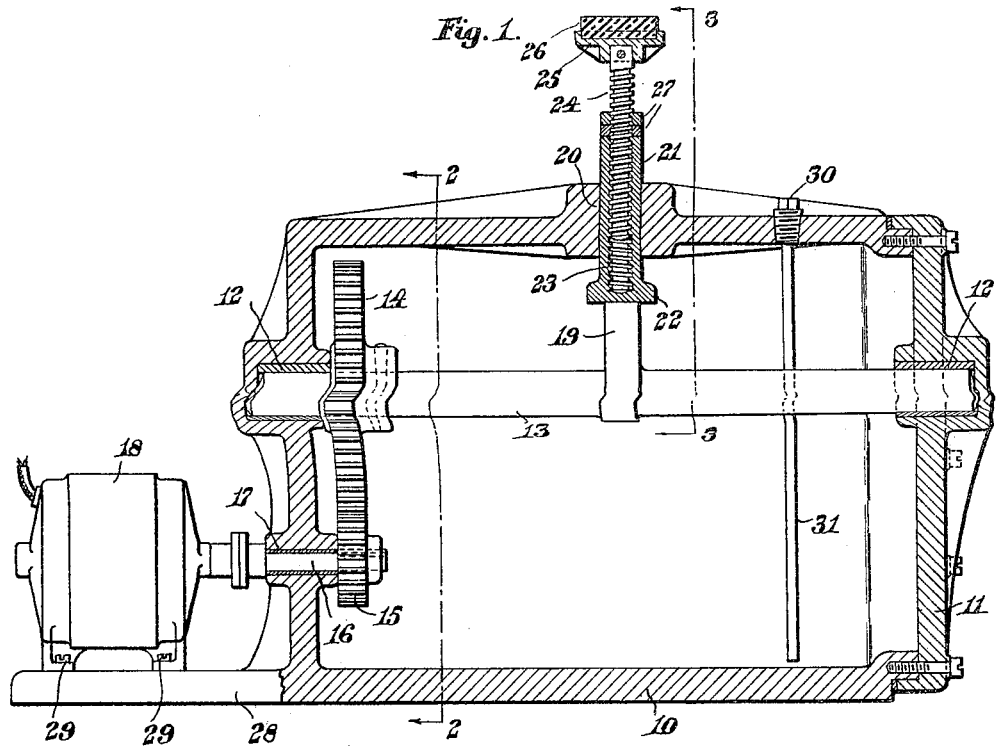
Figure 1 represents a longitudinal vertical section of a device embodying the principles of the present invention.
Figures 2, 3:
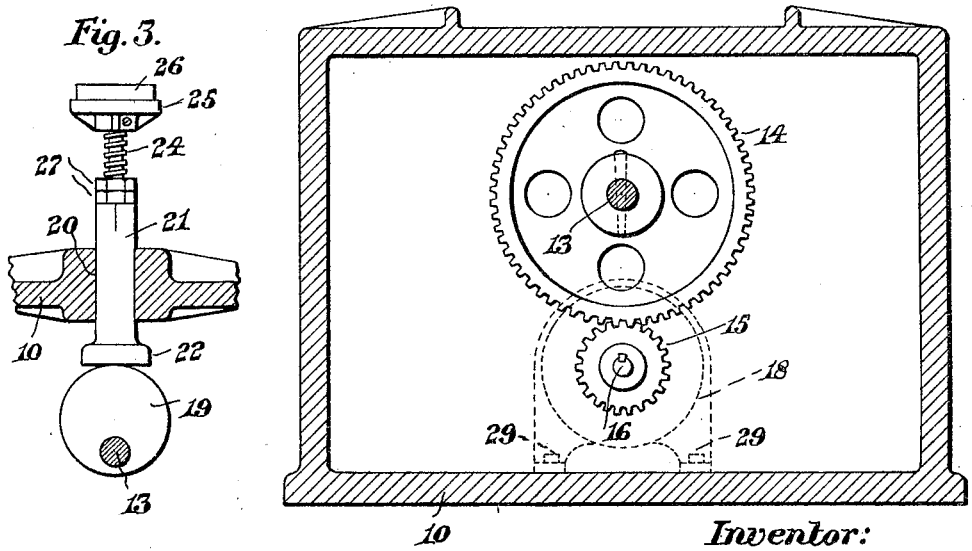
Figure 2 represents a transverse section of same on line 2, 2, on Fig. 1.
Figure 3 represents a transverse section of same on line 3, 3, on Fig. 1.

In the drawing 10 is a casing having a cover plate 11 at one end thereof.

This cover plate 11 and the end of the casing 10 opposite thereto each have a bearing 12 for the opposite ends of a rotatable shaft 13.

This shaft 13 has secured thereto a gear 14, the teeth of which mesh with the teeth of a pinion 15 on a short shaft 16 revolubly mounted in a bearing 17 in one end of the casing 10.

The outer end of the shaft 16 is coupled to an electric motor 18 by which said shaft 16 is adapted to be rotated to transmit rotary motion to the main shaft 13 by means of the pinion 15 and gear 14.

Formed integral with the shaft 13 is an eccentric cam 19 and above said cam and formed in the upper wall of casing 10 is a bearing 20 in which is slidably mounted a cylindrical reciprocating member 21.

The lower end of the reciprocating member 21 is provided with a flange 22 which prevents the displacement of said member 21 from the bearing 20.

This member 21 is provided with a female thread 23 to receive a screw 24 having a top plate 25 secured to the upper end thereof.

This top plate 25 has mounted thereon a resilient disk 26 adapted to be placed under the bracket of a running board of a motor vehicle when the device is in use.

As these brackets on different vehicles are of different heights the screw 24 is adjustable relatively to the member 23 and locked in adjusted position by the nuts 27.

The flanged end 22 of member 21 rests upon the periphery of cam 19 and when the shaft 13 is rotated a reciprocatory movement is imparted to member 21, the weight of the vehicle keeping the flanged end 22 thereof in contact with cam 19 at all times.

The casing 10 is provided with an outwardly extending base flange 28 to which the motor 18 is secured by bolts 29, so that when the casing 10 is moved about the garage the motor 18 will be moved therewith.

The upper wall of casing 10 is provided with a filling plug 30.

By removing this plug 30 the casing may be filled with oil in which all the rotatable members may revolve, thus keeping these members thoroughly lubricated at all times.

The plug 30 is preferably provided with a downwardly extending rod 31 by which the amount of lubricant within the casing 10 may be determined when desired.

The casing itself is of small size and may be easily moved about the garage for use on different cars and also for use upon the opposite sides of the same car.

The device is designed particularly for use when lubricating the shackle pins of the springs in order to have the lubricant spread over the entire surface of the pins.

When the device is placed under the running board bracket and put in operation, the body of the car will be raised and lowered at the rate of fifty times a minute, while the chassis remains stationary on the floor of the garage.

The effect will be that while the lubricant is being forced around the shackle pins, the constant movement of the body of the car causing the springs to move relatively to the shackle pins, said lubricant will spread all over the surface of said pins.

Heretofore, it has been almost impossible to lubricate thoroughly these shackle pins by the means usually employed but now by the use of the device described the pins may be better lubricated in a very short time, thus saving much labor and time.

It is believed that the operation and many advantages of the invention will be understood without further description.

Having thus described my invention, I claim:

1. A device for rocking the bodies of motor cars consisting of a portable support having a vertical bearing therein, a body-supporting member reciprocable in said bearing, a screw threaded to the upper end of said member, a resilient disk secured to the upper end of said screw, locking nuts on said screw, an eccentric for reciprocating said member, a revoluble shaft on which said eccentric is mounted, and an electric motor on said support for rotating said shaft.

2. A device for rocking the bodies of motor cars adapted to be disposed beneath an element of a motor car body and consisting of a portable closed casing, a revoluble shaft wholly confined therein, an eccentric on said shaft, a driving gear on said shaft, a pinion within said casing meshing with said gear, an electric motor for rotating said pinion secured to and movable with said casing, a vertically reciprocating member extending through the top of said casing and coacting with said eccentric, said eccentric having an unbroken peripheral surface, and a supporting head of relatively small dimensions at the upper end of said reciprocating member adapted to coact with a body part.

3. A device adapted to be disposed beneath the bodies of motor cars and rock the same consisting of a portable closed casing adapted to contain lubricant, a shaft revoluble therein, an eccentric on said shaft, a driving gear on said shaft, a pinion within said casing meshing with said gear, an electric motor movable with said casing for rotating said pinion, a vertically reciprocating member extending through the top of said casing and coacting with said eccentric, said eccentric having an unbroken peripheral surface, a screw threaded to said reciprocating member, and a supporting head of relatively small dimensions at the upper end of said screw adapted to coact with a body part.

4. A device adapted to be disposed beneath the bodies of motor cars and rock the same, consisting of a portable closed casing adapted to contain lubricant, a shaft revoluble therein, an eccentric on said shaft, a driving gear on said shaft, a pinion within said casing meshing with said gear, an electric motor movable with said casing for rotating said pinion secured to the base of said casing, a vertically reciprocating member extending through the top of said casing and coacting with said eccentric, said eccentric having an unbroken peripheral surface, means for varying the length of said reciprocating member, and a supporting head of relatively small dimensions at the upper end of said reciprocating member adapted to coact with a body part.

5. A device adapted to be disposed beneath the bodies of motor cars and rock the same consisting of a portable closed casing, a shaft revoluble therein, an eccentric having an unbroken peripheral surface, a driving gear on said shaft, a pinion meshing with said gear, an electric motor for rotating said pinion, a single vertically reciprocating member coacting with said eccentric, a supporting head of relatively small dimensions at the upper end of said reciprocating member adapted to coact with a body part, the said casing enclosing said shaft, gear, pinion and eccentric and provided in its side walls with closed bearings for the ends of said shaft and in its top wall with a bearing for said reciprocating member.

6. A device adapted to be disposed beneath the bodies of motor cars and rock the same consisting of a portable support, a revoluble shaft the opposite ends of which are disposed in bearings in the inner faces of said support, an eccentric on said shaft, a driving gear on said shaft, a pinion meshing with said gear, an electric motor on said support for rotating said pinion and coupled directly to the pinion shaft, a vertical member reciprocable in a bearing of said support and coacting with said eccentric, and a supporting head of relatively small dimensions at the upper end of said reciprocating member adapted to coact with a body part.

Signed by me at 294 Washington St., Boston, Massachusetts, this 22nd day of June, 1931.

GEORGE DEVER DEWEY.